W. YOUNG & A. NEILSON.
Apparatus for Refrigerating Liquids.
No. 222,433. Patented Dec. 9, 1879.
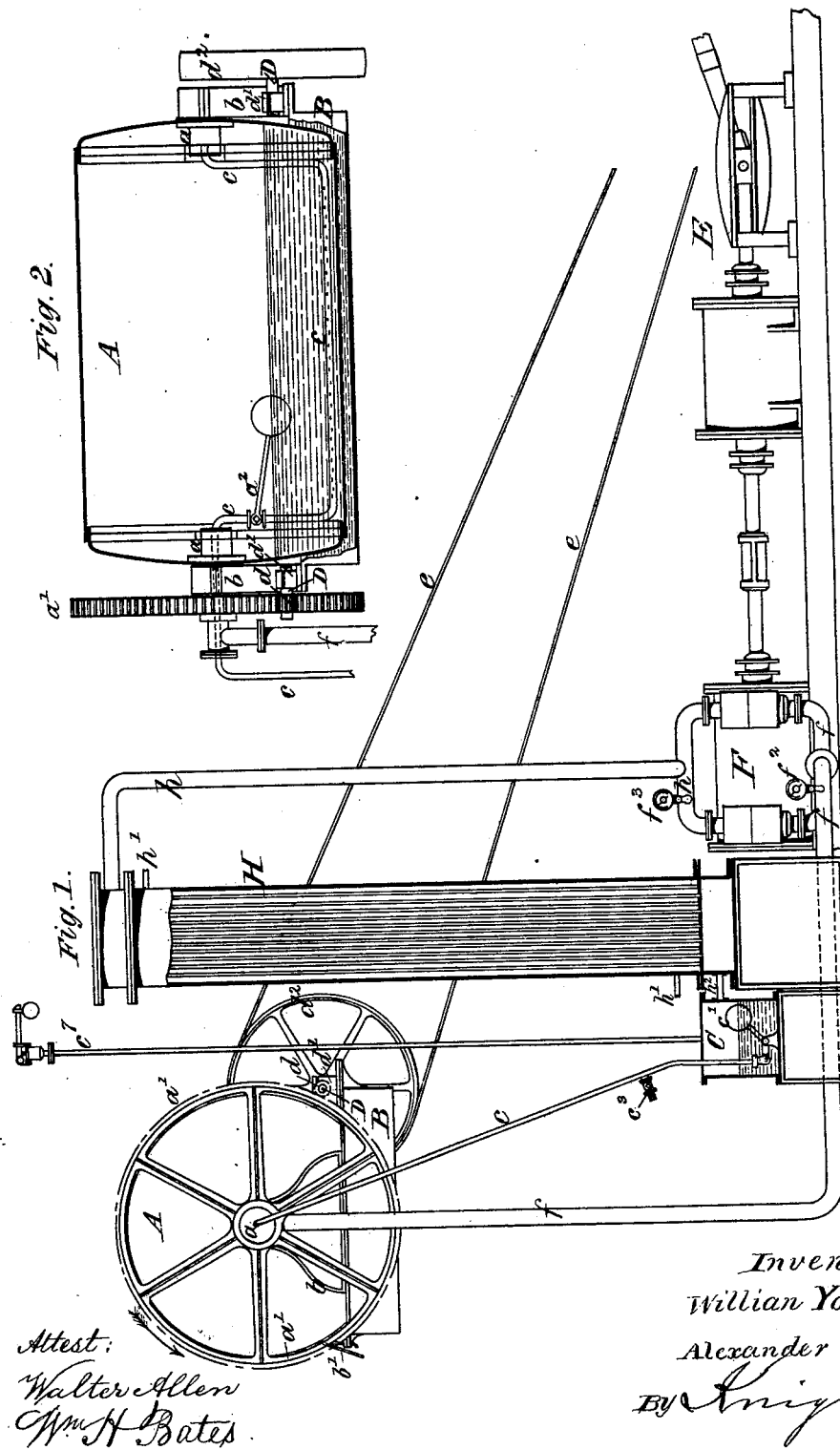

UNITED STATES PATENT OFFICE.

WILLIAM YOUNG AND ALEXANDER NEILSON, OF CLIPPENS, COUNTY OF RENFREW, NORTH BRITAIN.

IMPROVEMENT IN APPARATUS FOR REFRIGERATING LIQUIDS.

Specification forming part of Letters Patent No. 222,433, dated December 9, 1879; application filed January 29, 1879; patented in England, December 21, 1877.

*To all whom it may concern:*

Be it known that we, WILLIAM YOUNG and ALEXANDER NEILSON, both of Clippens, in the county of Renfrew, North Britain, have invented Improvements in Apparatus for Refrigerating Liquids, of which the following is a specification.

Our said invention relates to improvements in the apparatus and means employed to cool or freeze liquids, more particularly liquids such as oils, containing substances solid and crystallizable at low temperature—for example, paraffine, anthracen, stearine, and other analogous substances.

The invention also relates to the means employed for separating the solid from the semi-liquid cooled substances.

Hitherto in cooling paraffine and other oils containing crystallizable matters it has been customary to employ a current of brine as the medium between the refrigerating-machine and the drum-cylinder or equivalent vessel by which the paraffine or other oil is cooled.

One of the main features of this invention consists in making the paraffine or other oil-cooling drum or cylinder a part of the refrigerating-machine in the manner hereinafter described, and in dispensing with the use of the current of brine. Thus when the cooling is effected by the evaporation of volatile liquids, as is the case in what is known as the "ether-machine," the ether or other volatile liquid is, under the present invention, placed inside the revolving cooling drum or cylinder, from which the vapors are pumped, and into which the condensed ether is returned by pipes which pass through the trunnions of the drum or cylinder; or, when the oil is cooled inside the drum or cylinder, the ether or other volatile liquid is placed in a surrounding jacket or vessel outside the cylinder or drum in which the cooling is effected. The cooling drum or vessel is thus made to take the place of the refrigerator in the ordinary ether-machine.

In a similar manner, when expanding air, vapors, or gases are employed, the expansion is allowed to take place inside or in a chamber surrounding the cooling drum or vessel.

In Figure 1 of the accompanying drawings is represented an elevation, partly in section, of an apparatus suitable for carrying out this part of our invention, in which the evaporation of a volatile fluid (which we will suppose to be ether) is used as the means for refrigeration.

The drum A, which, with its connections, is also shown in longitudinal section in Fig. 2, is supported by trunnions $a$ in bearings $b$, so that in revolving the cylindrical surface of the said drum will rotate in a trough or tank, B, in which is placed the oil containing paraffine or other like fluid or semi-fluid to be cooled.

When the machine is in operation the ether which is used is continuously returned into the interior of the drum A from a condenser, H, by a pipe, $c$, passing through one of the trunnions $a$ of the said drum, the said pipe being bent so as to lie near the bottom of the interior of the said drum A, as seen at Fig. 2. The pipe $c$ is supported at its opposite end in the other of the trunnions $a$, and the said pipe is perforated at the lower part inside the drum A, and at the end which opens into the vessel C it is provided with a ball-valve, $c'$.

The drum is rotated by means of a toothed wheel, $a'$, with which gears a pinion, $d$, upon a shaft, D, carried in bearings $d'$, the said shaft receiving its motion from the engine E through a band, $e$, passed over the pulley $d^2$ upon the shaft D. The engine E drives a pump, F, by which a vacuum is created in the drum A, the air being drawn from the said drum through the pipe $f$, opening into one of the trunnions $a$ thereof, which trunnion is for this purpose made hollow. The air passing into the pump is expelled therefrom through the pipe $h$ into the tubes of the condenser H, from which it issues by the pipe $h^2$ to the vessel C, and finally escapes by the safety-valve on the pipe $c^7$.

The charging of the drum A with ether is effected after the vacuum is formed therein by the pump F, by means of a flexible pipe attached to the cock $c^3$, and at the other end to a reservoir containing ether. By the continued action of the pump F the ether passes, by reason of the vacuum created, through the pipe $c$, and out at the perforations thereof into the drum A, the vacuum therein enabling the ether to be evaporated by absorbing heat from the external liquid contained in the trough B, and carried on the external surface of the said drum A, whence it is continuously collected and cooled by the rotation of the drum in the trough B, the said substance, by the continued rotation of the drum A in the direction of the arrow, Fig. 1, being continuously detached in a cooled condition from the drum A by the scraper $b'$ and discharged therefrom into any suitable receptacle.

The vapor of ether from the drum A passes (by the action of the pump F) through the pipe $f$ into the pump, from whence it is discharged by the pipe $h$ down through the tubes of the condenser H. This condenser has a current of cold water passed through it in the opposite direction to the flow of the vapor of ether—that is to say, upward and exterior to the condenser-tubes—through the pipes $h'$, by which water the vapor of ether is condensed.

From the condenser H the ether passes, by the pipe $h^2$, into the vessel C as fluid ether. The pipe $c$ dips into the liquid ether in the vessel C, the ball or float valve $c'$ therein and the ball or float cock $a^2$ in the drum A regulating the admission of liquid ether to the drum A, according to the amount of such liquid ether flowing from the condenser into the vessel C—that is to say, when only one vessel or drum A is employed the whole of the condensed ether is returned thereinto, in which case the float or ball cock $a^2$ is unnecessary; but when several such drums or chambers A are used then the float or ball cock $a^2$ is applied to each such chamber A, for the purpose of preventing any one of the chambers becoming overcharged with liquid.

The inlet and outlet pipes of the pump F are provided with vacuum-gages, as shown in Fig. 1, where the said gages are marked $f^2 f^3$.

The drum A may be employed where the cooling is produced by the expanding of cooled compressed air, vapor, or gas. The drum or chamber A in such case becomes the receptacle for the compressed air, vapor, or gas, and from which the cooling effect is produced in the manner well understood with this mode of refrigerating.

We are aware that refrigerating apparatus have been already constructed where the ether-receptacle is of cylindrical form, the supply of ether to such cylinder being regulated by means of a ball-valve.

We are also aware that such cylinders have been arranged to rotate in a trough, within which is contained a suitable non-congealable liquid. Such features, therefore, we do not broadly claim; but What we do claim is—

1. The drum A, provided with the scraper $b'$, and having hollow trunnion $a$, perforated pipe $c$, having suitable ball valves and cock, condenser H, having pipes $h\ h'\ h^2$, ether-reservoir C, pipe $c^7$, and pump F, having pipe $f$ and vacuum-gages $f^2 f^3$, substantially as and for the purpose set forth.

2. The combination, with the ether-reservoir C and drum A, having hollow trunnions $a$, of the pipe $c$, passing through said hollow trunnions, and perforated at its lower part, and having ball-valve $c$ and cock $c^3$, substantially as and for the purpose set forth.

3. The combination, with the revolving drum A, perforated pipe $c$, and reservoir C, of the vacuum-creating pump F, pipe $f$, condenser H, and pipes $h\ h'\ h^2\ c^7$, substantially as and for the purposes set forth.

In testimony whereof we have signed our names to this specification in the presence of two subscribing witnesses.

WILLIAM YOUNG. [L. S.]
ALEXANDER NEILSON. [L. S.]

Witnesses:
JAMES YATE JOHNSON,
115 St. Vincent Street, Glasgow.
R. A. GUNN,
115 St. Vincent Street, Glasgow.